(12) United States Patent
McNew

(10) Patent No.: US 11,535,085 B2
(45) Date of Patent: Dec. 27, 2022

(54) VEHICLE EXHAUST INTRUSION MITIGATION SYSTEM

(71) Applicant: Toyota Motor Engineering & Manufacturing North America, Inc., Plano, TX (US)

(72) Inventor: John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 536 days.

(21) Appl. No.: 16/692,513

(22) Filed: Nov. 22, 2019

(65) Prior Publication Data

US 2021/0155077 A1    May 27, 2021

(51) Int. Cl.
| | |
|---|---|
| *B60H 1/00* | (2006.01) |
| *F02B 77/08* | (2006.01) |
| *F01N 9/00* | (2006.01) |
| *B60H 1/26* | (2006.01) |

(52) U.S. Cl.
CPC ........... *B60H 1/00864* (2013.01); *B60H 1/26* (2013.01); *F01N 9/007* (2013.01); *F02B 77/086* (2013.01)

(58) Field of Classification Search
CPC ................. B60H 1/00835; B60H 1/00814
USPC ....................... 454/75–165; 701/36
See application file for complete search history.

(56) References Cited

U.S. PATENT DOCUMENTS

| | | | |
|---|---|---|---|
| 8,972,152 B2 * | 3/2015 | Boesch | F02N 11/0837 701/112 |
| 9,931,909 B2 | 4/2018 | McNew | |
| 2011/0288717 A1 * | 11/2011 | Yu | B60K 11/085 454/75 |
| 2015/0203156 A1 * | 7/2015 | Hafner | G08G 1/143 701/36 |
| 2020/0398640 A1 * | 12/2020 | Chang | B60H 1/00792 |

FOREIGN PATENT DOCUMENTS

| | | |
|---|---|---|
| DE | 102012219487 A1 | 5/2013 |
| EP | 2485933 A2 | 8/2012 |
| KR | 20000010578 U | 6/2000 |
| KR | 20130038906 A | 4/2013 |

* cited by examiner

*Primary Examiner* — Ko-Wei Lin
(74) *Attorney, Agent, or Firm* — Christopher G. Darrow; Darrow Mustafa PC

(57) ABSTRACT

An exhaust intrusion mitigation system for a vehicle includes one or more processors and a memory communicably coupled to the one or more processors. The memory stores an enclosure detection module which determines if a vehicle is parked within an enclosure with the engine running. An exhaust module determines a point in time at which one or more vehicle vents should be closed if the vehicle remains in the enclosure and the engine remains on. A mitigation module controls operation of the vehicle to close the one or more vents at the point in time when the vent(s) should be closed.

20 Claims, 9 Drawing Sheets ns. In some
VEHICLE EXHAUST INTRUSION MITIGATION SYSTEM

TECHNICAL FIELD

The subject matter described herein relates, in general, to autonomous control of vehicle systems and, more particularly, to mechanisms and methods for controlling vents in a vehicle HVAC system.

BACKGROUND

It is common in modern motor vehicles to enable remote starting of the engine using a key fob, for the purpose of warming up the occupant compartment on cold days, for example. The vehicle may reside in an enclosure (such as a private garage) when the engine is running. It may be desirable for the vehicle HVAC vents to remain open while the interior is being warmed, because air recirculated from the vehicle interior with the vents closed may cause the windows to fog. However, if the vehicle is in the enclosure for too long with the vents open, an undesirable level of vehicle exhaust may seep into the occupant compartment through the open vents. In addition, when the concentration of vehicle exhaust in a confined space reaches a certain level, the exhaust may begin to seep into the vehicle interior even if the vents are closed. A user may be delayed in entering the vehicle after remotely starting the engine, or the user may not remember or know that the vehicle is parked in an enclosure where vehicle exhaust can build up. The user may also not be aware of whether the vehicle vents are open or closed.

SUMMARY

In one aspect of the embodiments described herein, an exhaust intrusion mitigation system for a vehicle is provided. The system includes one or more processors and a memory communicably coupled to the one or more processors. The memory stores an enclosure detection module including instructions that, when executed by the one or more processors, cause the one or more processors to determine if a vehicle engine is turned on. Responsive to a determination that the vehicle engine is turned on, the enclosure detection module determines if the vehicle is stationary. Responsive to determinations that the vehicle is stationary and the engine is turned on, the enclosure detection module determines if the vehicle currently resides within an enclosure. The memory also stores an exhaust module including instructions that when executed by the one or more processors cause the one or more processors to, responsive to determinations that the vehicle is stationary, the engine is turned on, and the vehicle currently resides within an enclosure, determine a point in time at which at least one vent of the vehicle should be closed if the vehicle remains in the enclosure and the engine remains on. The memory also stores a mitigation module including instructions that when executed by the one or more processors cause the one or more processors to control operation of the vehicle to close the at least one vent at the point in time when the at least one vent should be closed.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The present invention relates to various embodiments of a vehicle exhaust intrusion mitigation system. The system may detect when a vehicle is parked in an enclosure with the engine on. The enclosure may be a confined or enclosed space in which vehicle exhaust will build up if the vehicle engine is left on. The system may determine a point in time when the vehicle vents should be closed (if they are open) to aid in preventing exhaust from seeping from the vehicle exterior through the vents and into the vehicle occupant compartment. After the vents have been closed, the system may continue to monitor the vehicle and the vehicle environment to determine a point in time when the further exhaust mitigation measures should be implemented if the vehicle remains inside the enclosure with the engine running. The system may determine various exhaust intrusion mitigation options available to a user who is located remotely from the vehicle. The system may present these options to the user. The user may select one or more exhaust intrusion mitigation options which may then be implemented by the vehicle.

Figure 1:
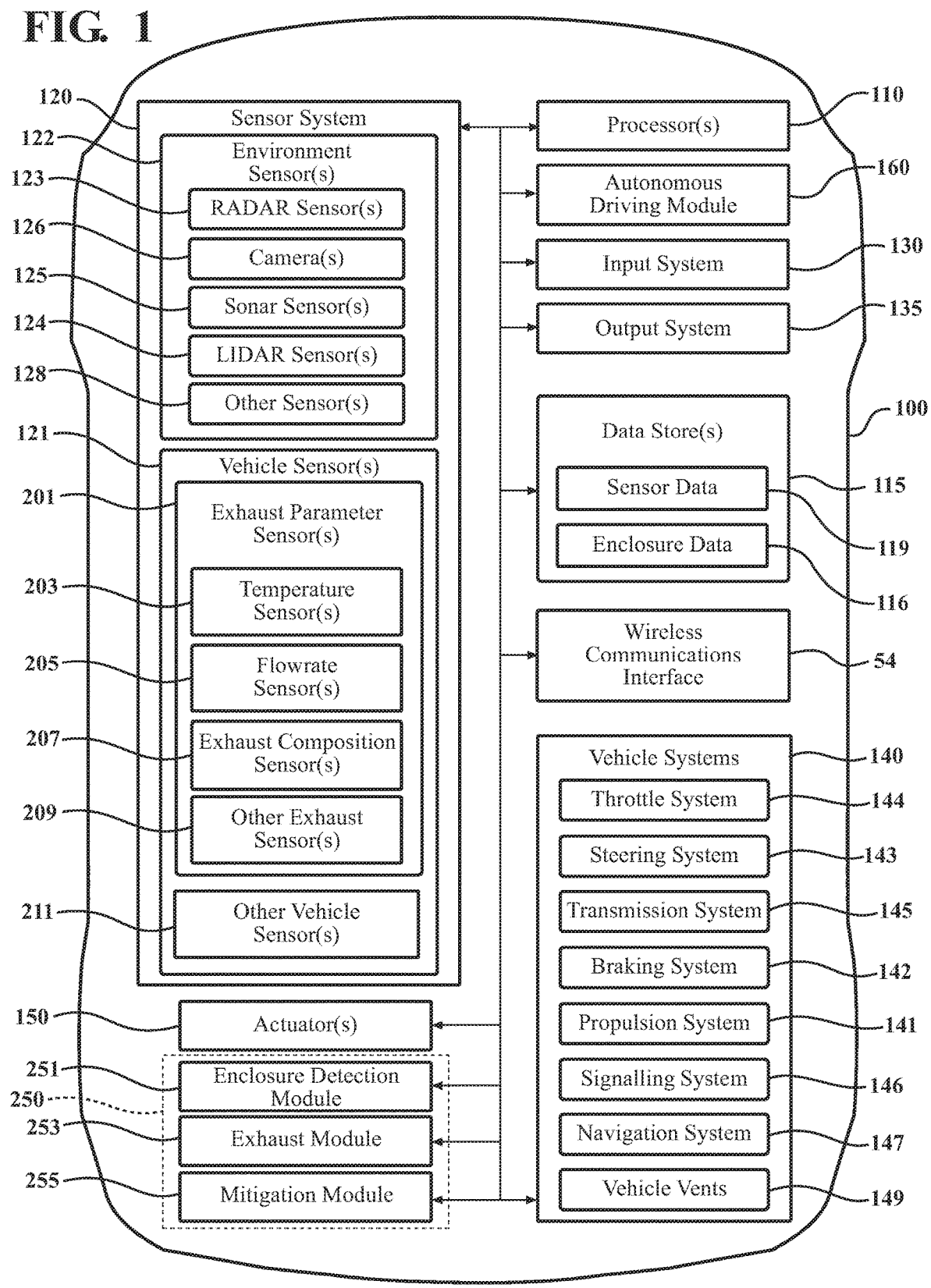
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, emits exhaust or gaseous emissions during operation of the vehicle, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 is a block schematic diagram of a vehicle 100 incorporating an exhaust intrusion mitigation system (generally designated 250) in accordance with an embodiment described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. "Autonomous mode" may also refer to autonomous operations of the vehicle in response to residing in an enclosure in which vehicle exhaust is accumulating, as described herein. Such operations may include operations designed to mitigate exhaust intrusion into the vehicle occupant compartment.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include enclosure data 116. The enclosure data 116 may include maps of the interior volumes and features of various enclosures in which the vehicle resides, may reside, or has resided in. The maps may be accessed from an off-vehicle database and stored in the enclosure data 116. In addition, the maps may be compiled by operation of the vehicle sensors 121, processors 110 and enclosure detection module 251 as the vehicle enters and inhabits various enclosures. Geographical coordinates (such as GPS coordinates) may be associated with stored enclosures to enable determination as to whether the vehicle has occupied an enclosure previously. If the vehicle has occupied an enclosure previously, a volumetric map for the enclosure may be accessed (if available) for use by the vehicle in exhaust intrusion mitigation determinations. The enclosure detection module 251 may include instructions that, when implemented by processors 110, perform a comparison between a stored volumetric map and another map which may be generated while the vehicle 100 is currently in the enclosure. This enables stored enclosure maps to be updated, if needed.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the enclosure data 116 and/or the sensor data 119 can be located in one or more data stores 115 located onboard the vehicle 100. Alternatively, or in addition, at least a portion of the enclosure data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby objects, vehicle exhaust parameters). Such information may be used to determine, for example, whether the vehicle resides in an enclosure.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

The vehicle sensor(s) 121 may include exhaust parameter sensors 201. Exhaust parameter sensors 201 may include sensors configured to detect or estimate various characteristics of the vehicle exhaust. For example, temperature sensor(s) 203 may be configured to sense exhaust temperature. Flowrate sensor(s) 205 may be configured to measure the flowrate of the exhaust from the vehicle 100. Exhaust composition sensor(s) 207 may be configured to detect, estimate, or provide data usable for determining the composition of the exhaust (e.g. percentages of carbon monoxide (CO) and other exhaust constituents). Alternatively, as described elsewhere herein, the exhaust composition may be estimated based on periodic samplings of exhaust from the vehicle 100. Other exhaust sensor(s) 209 may be provided and configured as needed to detect or aid in determining other exhaust parameters. Other vehicle sensor(s) 211 may detect and/or aid in determining other characteristic(s) and condition(s) of the vehicle. Other sensor(s) 211 may include vent status sensors (not shown) configured for detecting a current status (i.e., closed or open) of one or more of the vehicle vents 149.

In addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc. Environment sensors 122 may also include sensors configured to detect (or acquire data usable to estimate) the characteristics of an enclosure in which the vehicle resides, in the manner described herein.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger) or a user located remotely from the vehicle 100. The vehicle 100 can include an output system 135. An "output system" includes any device, component, or arrangement or groups thereof that enable information/data to be presented to a vehicle passenger (e.g., a person, a vehicle passenger, etc.) or a remote user.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. Vehicle 100 may also include an HVAC system incorporating one or more vehicle vents 149 configured to be actuatable by associated ones of actuators 150.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the enclosure detection module 251, the exhaust module 253, the mitigation module 255 and/or the autonomous driving module(s) 160 can be operably connected to communicate with the other elements of the vehicle, including various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous. The processor(s) 110 and/or the autonomous driving module(s) 160 may control some or all of the vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. For example, certain actuators may be operably coupled to the vehicle vents 149 to autonomously open and/or close the vents responsive to a control command.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 may be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Figure 2:
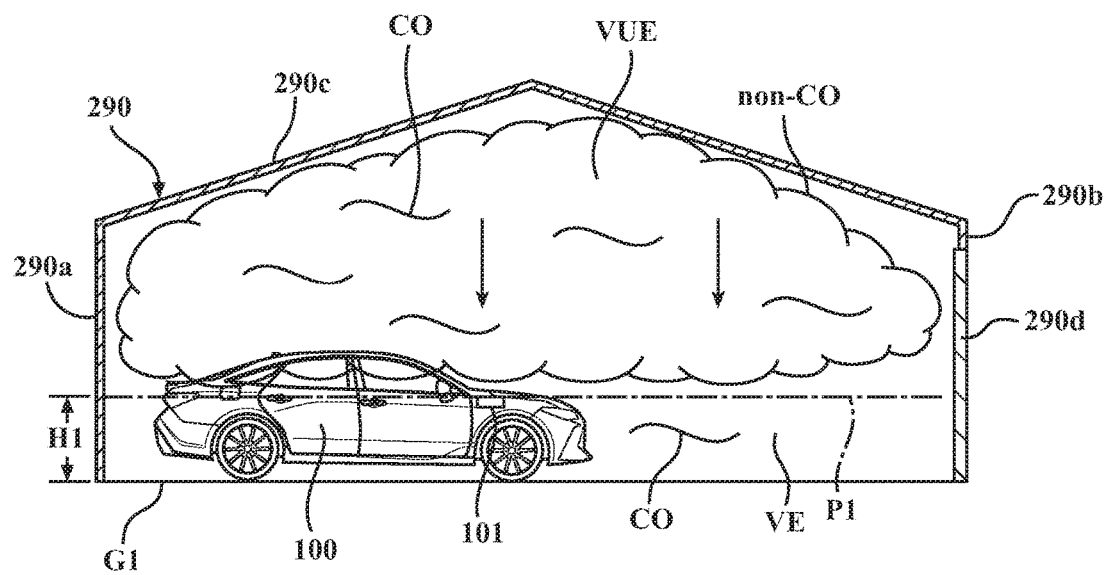
FIG. 2 illustrates one example of an enclosure in which a vehicle may reside, and in which an exhaust intrusion mitigation system in accordance with an embodiment described herein may be implemented.

The vehicle 100 can include an enclosure detection module 251. In one or more embodiments, the enclosure detection module 251 may include computer-readable instructions that, when executed by the processors 110 during operation of the exhaust intrusion mitigation system 250, cause the processors to perform the various functions disclosed herein. The enclosure detection module 251 may cause the processors to determine whether or not the vehicle 100 resides in an enclosure. For the purposes described herein, an "enclosure" may be defined as a volume of space in which the vehicle 100 resides, which has boundaries detectible by vehicle sensors, and in which the boundaries are within pre-determined distance(s) from the vehicle 100. Referring to FIG. 2, one example 290 of an enclosure may be a private garage attached to (or adjacent) a home of the user and in which the vehicle 100 may be parked. Such a garage may have walls 290a, 290b and a ceiling 290c located within predetermined distance(s) from the vehicle 100. Enclosure 290 may also have a door 290d which may or may not be controllable by a signal from the vehicle 100.

For purposes of the exhaust intrusion mitigation system 250, one or more of the predetermined distances and locations of the boundaries which may prompt activation of the exhaust intrusion mitigation system may be pre-programmed by the vehicle or mitigation system manufacturer and/or the system may be configured to enable a user to specify and/or alter the predetermined distances to tailor the system to a particular enclosure.

Referring to FIG. 2, the vehicle environment sensors 122 may be configured to detect the presence and dimensions of structures in the vehicle environment (such as walls 290a, 290b and ceiling 290c), to determine and/or estimate the distances of the various portions of these structures from one or more reference locations on the vehicle 100, and to acquire or estimate other parameters pertinent to a determination of whether or not the vehicle 100 resides in an enclosure, the volume of the enclosure 290, and other pertinent characteristics of the enclosure. Using this information, the enclosure detection module may cause the processor(s) 110 to determine and/or estimate information such as whether the vehicle 100 resides in an enclosure, the total volume of the enclosure outside the vehicle and available to receive vehicle exhaust therein, and the volumes of specific portions of the enclosure.

For purposes of defining an enclosure which will prompt activation of the exhaust intrusion mitigation system 250, it may be assumed that exhaust fumes will migrate outwardly from the vehicle 100 into any available spaces surrounding the vehicle. Therefore, if boundaries of a structure surrounding the vehicle 100 lie outside pre-determined limits, concentrations of exhaust gases will not be able build up in the immediate vicinity of the vehicle, but rather will disperse into any other available spaces. For example, another location where the vehicle 100 may be parked with the engine turned on is in a public parking garage or facility (not shown). In one or more arrangements, the enclosure detection module 251 may cause the processor(s) 110 to determine that, when the vehicle is parked in such a facility, it is not parked in an "enclosure" as defined herein (i.e., such a facility may not meet the definition of an "enclosure"). For example, in certain cases, the ceiling of such a facility may lie at a distance beyond the predetermined distance or boundary limit required for classification of the structure as an "enclosure". Also, in certain cases, one or more walls of the parking structure may be spaced apart from the vehicle at distances which the vehicle sensors are not configured to detect, or which lie far outside the boundary limits required for classification of the structure as an "enclosure". Also, walls of the parking structure may have openings which act to vent gases discharged into the parking areas.

The enclosure detection module 251 may cause the processor(s) 110 to determine if the vehicle engine is turned on or off. The enclosure detection module 251 may cause the processor(s) 110 to, responsive to a determination that the vehicle engine is turned on, determine if the vehicle 100 is stationary. The enclosure detection module 251 may cause the processor(s) 110 to, responsive to determinations that the vehicle 100 is stationary and the engine is turned on, determine if the vehicle currently resides within an enclosure. The enclosure detection module 251 may cause the processor(s) 110 to determine or estimate a total volume of the enclosure outside of vehicle 100 and unoccupied so as to suitable for receiving vehicle exhaust therein. The enclosure detection module 251 may cause the processor(s) 110 to estimate a volume of a portion of the enclosure residing outside of the vehicle 100 and above a level of an opening of a highest vent 101 of the vehicle 100.

In one or more embodiments, the exhaust module 253 may include computer-readable instructions that, when executed by the processors 110, cause the processors to perform various functions as disclosed herein. The exhaust module 253 may cause the processor(s) 110 to determine or estimate (based on sensor data) flowrates of CO and non-CO constituents in the vehicle exhaust. The exhaust module 253 may cause the processor(s) 110 to estimate (based on sensor data) the amount of time that will elapse until a predetermined threshold level of carbon monoxide (CO) within the enclosure is reached. The exhaust module 253 may also cause the processor(s) 110 to estimate (based on sensor data) the amount of time that will elapse until a concentration of non-CO constituents in the atmosphere within the enclosure reaches another predetermined threshold level. Although the threshold levels described herein may be discussed in terms of predetermined concentrations of carbon monoxide (CO) and non-carbon monoxide constituents in the atmosphere within the enclosure (expressed in parts per million (ppm), for example), threshold levels for the exhaust constituents may be based on (and/or expressed in terms of) any other suitable criteria. The target predetermined thresholds of exhaust gas components may be specified by a vehicle manufacturer and/or mitigation system manufacturer based on the known effectiveness of the vehicle ventilation system in preventing ingress of exhaust fumes when the system is closed, the allowable "safe" limits of various exhaust gas components, and other pertinent factors.

The flowrates of the CO and non-CO exhaust gas components may be determined using the overall exhaust gas flowrate and information regarding the constituents of the exhaust flow. The constituents of the exhaust flow and the characteristics of the exhaust constituents may be estimated, for example, based on samples of vehicle exhaust taken at regular intervals and analyzed. The exhaust samples may be taken with the vehicle in a static condition with the engine idling to simulate conditions under which the mitigation system 250 may operate. The analysis results may be stored in data stores 115. Alternatively, the exhaust constituents and their concentrations may be detected and/or estimated in real time using data from suitable onboard sensors. In one or more embodiments, the mitigation system 250 may assume that carbon monoxide from the vehicle exhaust will disperse evenly through the enclosure, and that other (i.e., non-CO) exhaust gas components will rise, so that these non-CO components will fill the enclosure from the top down.

In one or more embodiments, the exhaust module 253 may cause the processor(s) 110 to, responsive to determinations by the enclosure detection module that the vehicle 100 is stationary, the engine is turned on, and the vehicle 100 currently resides within an enclosure, determine a point in time at which the vehicle vents 149 should be closed if the vehicle 100 remains in the enclosure and the engine remains on. In one or more particular embodiments, to aid in determining a point in time at which the vehicle vent should be closed, the exhaust module 253 may cause the processor(s) 110 to detect (through the vehicle sensors) or estimate a flowrate of carbon monoxide (CO) in exhaust being discharged from the vehicle. The exhaust module 253 may further cause the processor(s) 110 to, based on the detected or estimated flowrate of carbon monoxide in exhaust being discharged from the vehicle 100, estimate a point in time TA when a concentration of carbon monoxide from the exhaust in the total volume of the enclosure outside of the vehicle will reach a first predetermined carbon monoxide threshold. Also, to aid in determining the point in time at which the vehicle vents 149 should be closed, the exhaust module 253 may further cause the processor(s) 110 to estimate a flowrate of exhaust constituents other than carbon monoxide being discharged from the vehicle 100. The exhaust module 253 may further cause the processor(s) 110 to estimate a point in time TB when a concentration of the constituents other than carbon monoxide from the exhaust in the volume of the enclosure outside of vehicle 100 and above the level of the opening of the highest vent of the vehicle will reach a first predetermined non-carbon monoxide constituent threshold.

Referring to FIG. 2, the total available volume of the enclosure 290 into which exhaust may migrate may be designated VE, while the available volume of the enclosure above the plane P1 into which exhaust may migrate may be designated VUE. The highest vent 101 of a vehicle may be a vent having a highest vertical spacing H1 from a floor or ground surface G1 on which the vehicle 100 rests while in the enclosure 290. Since the non-CO constituents of the exhaust are assumed to be lighter than air and to fill the enclosure from the top down, these constituents may reach the highest vent 101 of the vehicle 100 before reaching any relatively lower vents. Thus, the dimension H1 shown in FIG. 2 may be the vertically highest edge of an opening into the highest vent on the vehicle, and a horizontal plane P1 extending through this location may be taken as the lower limit of a portion of the enclosure volume VUE to be determined for purposes of estimating the concentration of non-CO exhaust components to which the vehicle is being exposed. The location of the plane P1 may be determined by the enclosure detection module using the enclosure dimensions in conjunction with known vehicle information regarding the locations, dimensions, and other characteristics of the vehicle vents obtainable from the vehicle manufacturer. This vent information may be stored in the data stores 115. The volume VUE of the enclosure above the plane P1 may be determined using instructions stored in the enclosure detection module, as previously described. This volume VUE of the enclosure above the plane P1 may be used by the exhaust module in determining when the non-CO constituents are projected to reach any associated predetermined thresholds.

Also, to aid in determining the point in time at which the vehicle vents 149 should be closed, the exhaust module 253 may further cause the processor(s) 110 to compare the point in time TA with the point in time TB to determine if the point in time TA will arrive earlier than or at the same time as the point in time TB. The exhaust module 253 may further cause the processor(s) 110 to, if the point in time TA will arrive earlier than or at the same time as the point in time TB, assign the point in time TA as the point in time when the vent(s) should be closed. The exhaust module 253 may further cause the processor(s) 110 to, if the point in time TB will arrive earlier than the point in time TA, assign, as the point in time when the vent(s) should be closed, the point in time TB.

After the vehicle vents have been closed, exhaust gases will continue to accumulate in the enclosure 290 if the engine remains on and there is no exit path for the gases from the enclosure sufficient to prevent a net increase in the exhaust level. For purposes of mitigation system operation, it may be assumed that the exhaust will begin to pass through the closed vents into the vehicle occupant compartment when the concentrations of one or more of carbon monoxide and the non-CO gas constituents have reached certain threshold level(s). The threshold level at which each type of exhaust constituent will be assumed to pass through the closed vents may be determined by analysis and/or experimentation regarding the particular type of vehicle, the types of exhaust emitted by the vehicle, vehicle vent structures, and other pertinent factors. The vent pass-through thresholds for various exhaust constituents may be stored in the vehicle data stores 115 for use by processor(s) in determining points in time when further mitigation steps should be taken, as described herein. For such pass-through conditions, the exhaust module 253 may further cause the processor(s) 110 to estimate a point in time TC at which the concentration of carbon monoxide from the exhaust in the total volume of the enclosure outside of vehicle 100 will reach a second predetermined carbon monoxide threshold. The exhaust module 253 may further cause the processor(s) 110 to estimate a point in time TD when the concentration of constituents other than carbon monoxide (i.e., non-CO constituents) from the exhaust in the volume VUE will reach a second predetermined non-carbon monoxide constituent threshold.

The exhaust module 253 may further cause the processor(s) 110 to determine if the point in time TC will arrive earlier than or at the same time as the point in time TD. The exhaust module 253 may further cause the processor(s) 110 to, if the point in time TC will arrive earlier than or at the same time as the point in time TD, assign the point in time TC as the point in time when further mitigation should be implemented. The exhaust module 253 may further cause the processor(s) 110 to, if the point in time TD will arrive earlier than the point in time TC, assign, as the point in time to implement further mitigation, the point in time TD.

In one or more embodiments, the mitigation module 255 may include computer-readable instructions that, when executed by the processors 110 during operation of the exhaust intrusion mitigation system 250, cause the processors to perform various functions disclosed herein. The mitigation module 255 may be configured to control vehicle operations related to mitigating and preventing (either autonomously or by the prompting and/or implementation of user commands) the intrusion of emissions into the passenger compartment. The mitigation module 255 may control any of vehicle actuators 150 and other elements and/or systems configured to control operation of the elements of the vehicle 100 usable for exhaust intrusion mitigation as described herein. For example, the mitigation module 255 may cause the processor(s) 110 to control operation of the vehicle 100 to close the vehicle vents 149 at the point in time when the vents should be closed. Operation of the various elements and systems of the vehicle may be controlled directly by the mitigation module 255 or another module, or the operations may be controlled by the mitigation module 255 (or another module) by generating a signal to from the mitigation module to an element or system of the vehicle prompting further action by the element or system. For example, the mitigation module 255 may be configured to, under certain conditions, generate a signal to autonomous driving module 160 prompting the module 160 to attempt to autonomously drive the vehicle out of an enclosure.

In one or more embodiments, various ones of the exhaust intrusion mitigation actions described herein may be interactively presented to a user and selected by a user. The mitigation module 255 may cause the processor(s) 110 to control operation of the vehicle 100 to implement any user-selected mitigation options. The user may elect (by activating a "system user-instruction option") that the mitigation system 250 inform the user as to when the exhaust constituents in an enclosure are approaching thresholds at which mitigation responses would be advisable, so that the user may select one or more mitigation responses according to preference.

The mitigation module 255 may cause the processor(s) 110 to initiate and manage transmission of alerts to a user when the exhaust constituents in an enclosure are approaching thresholds at which mitigation responses would be advisable, and transmission of available mitigation options to the user. The mitigation module 255 may also cause the processor(s) 110 to manage communications from the user to the vehicle, such as user selection of one or more mitigation options from a menu presented to the user. Communications between the exhaust intrusion mitigation system 250 and a user may be via a wireless communications interface 54 incorporated into the vehicle for communication with a user's cellular device, for example.

In one or more embodiments, various ones of the exhaust intrusion mitigation actions described herein may be implemented autonomously and automatically, responsive to one or more exhaust constituents in an enclosure approaching thresholds at which mitigation responses would be advisable. One or more of the automatic responses may be pre-selectable by a user and/or one or more of the automatic responses may be specified by a vehicle or system manufacturer or other provider.

In one or more embodiments, the mitigation module 255 may cause the processor(s) 110 to, prior to the point in time when the vehicle vents should be closed, determine if a system user-instruction option is activated. The mitigation module 255 may cause the processor(s) 110 to, responsive to a determination that the user instruction option is activated, determine vehicle instruction options are available to a user. Available vehicle instruction options may depend on the structure and features of the particular vehicle, the nature of the enclosure, and other pertinent factors. For example, certain vehicles may also be configured to control operation of a door of an enclosure in which the vehicle resides, so that the door may be opened and closed by commands from the vehicle 100. Thus, possible vehicle instruction options may include instructions to open a door of the enclosure. In addition, certain vehicles (such as the vehicle embodiments described herein) may be configured for autonomous driving. Thus, another possible vehicle instruction option may be for the vehicle to autonomously drive itself through an open enclosure door and out of the enclosure. This would remove the vehicle from the undesirable accumulation of exhaust in the enclosure.

Another possible vehicle instruction option may be to open the enclosure door without moving the vehicle. Another possible vehicle instruction option may be to simply shut off the engine. Another possible vehicle instruction option may be to close the vehicle vents 149 responsive to user command, even if the command is given before the predetermined thresholds of one or more of the exhaust constituents are reached. Another possible vehicle instruction option may be instruct the vehicle that the vents 149 are not to close at a proposed point in time. One example of a situation where such an option may be selected by a user is a case where the user wants to leave the vents open because they choose to issue instructions for the enclosure door to be opened and for the vehicle to autonomously drive itself out of the enclosure.

The mitigation module 255 may cause the processor(s) 110 to generate a message to a user. The message may be configured to enable selection of one or more of the available vehicle instruction options by the user. The mitigation module 255 may cause the processor(s) 110 to, responsive to selection of one or more of the available vehicle instructions options by the user, control operation of the vehicle to implement the user-selected ones of the one or more vehicle instruction options.

In one or more examples, the mitigation module 255 may cause the processor(s) 110 to generate a message to the user including a vehicle instruction option to transmit to the user a live video feed comprising vehicle camera images of vehicle surroundings including at least a portion of the enclosure. The mitigation module 255 may also cause the processor(s) 110 to determine which vehicle instructions are available for user selection. In one example of a user interactive control sequence, the mitigation module may cause the processor(s) 110 to determine if the vehicle is capable of autonomously controlling/operating a door of the enclosure to open the door.

The mitigation module 255 may cause the processor(s) 110 to, responsive to a determination that the vehicle is capable of autonomously controlling a door of the enclosure to open the door, generate a message to the user including a vehicle instruction option to control the door of the enclosure to open the door. The mitigation module 255 may also cause the processor(s) 110 to, responsive to user selection of the vehicle instruction option to control the door of the enclosure to open the door, control operation of the door of the enclosure to open the door.

In another example of a user interactive control sequence, the mitigation module 255 may cause the processor(s) 110 to determine if the vehicle 100 is capable of autonomously driving itself out of the enclosure. The mitigation module 255 may also cause the processor(s) 110 to, responsive to a determination that the vehicle is capable of autonomously driving itself out of the enclosure, generate a message to the user including a vehicle instruction option to control operation of the vehicle to autonomously drive the vehicle out of the enclosure. The mitigation module 255 may also cause the processor(s) 110 to, responsive to user selection of the vehicle instruction option for controlling operation of the vehicle to autonomously drive the vehicle out of the enclosure, generate one or more signals to the autonomous driving module to control operation of the vehicle to autonomously drive the vehicle out of the enclosure.

In another example of a user interactive control sequence, the mitigation module 255 may cause the processor(s) 110 to generate a message to the user including a vehicle instruction option to control operation of the vehicle to shut of the engine. The mitigation module 255 may cause the processor(s) 110 to, responsive to user selection of the vehicle instruction option to control operation of the vehicle to shut of the engine, control operation of the vehicle to shut of the engine.

The mitigation module 255 may also include instructions which may be implemented automatically, for example, by default in the absence of direct user control, or as one or more user pre-selected commands when a point in time is reached where an exhaust constituent is deemed to have reached a predetermined threshold. For example, the mitigation module 255 may cause the processor(s) 110 to, responsive to a determination that the user instruction option is not activated, determine if the point in time when the vents should be closed has been reached. The mitigation module 255 may also cause the processor(s) 110 to, responsive to a determination that the point in time has been reached when the vents should be closed, generate a command to close all vehicle vents 149.

The mitigation module 255 may also cause the processor(s) 110 to determine if all vehicle vents are closed, responsive to a command to close all the vents 149. "Closed" means fully closed with the intention of preventing all gaseous intake into the vehicle passenger compartment. The mitigation module 255 may cause the processor(s) 110 to, responsive to a determination that all vehicle vents are not closed, determine if the vehicle is capable of autonomously driving itself out of the enclosure. The mitigation module 255 may cause the processor(s) 110 to, responsive to a determination that the vehicle is not capable of autonomously driving itself out of the enclosure, control operation of the vehicle to shut off the engine.

In one or more embodiments, the mitigation module 255 may cause the processor(s) 110 to, responsive to a determination that the vehicle 100 is capable of autonomously driving itself out of the enclosure, determine if the vehicle is capable of autonomously controlling a door of the enclosure to open the door. The mitigation module 255 may cause the processor(s) 110 to, responsive to a determination that the vehicle is not capable of autonomously controlling a door of the enclosure to open the door, control operation of the vehicle to shut off the engine.

In one or more implementations, the mitigation module 255 may cause the processor(s) 110 to, responsive to a determination that the vehicle is capable of autonomously controlling a door of the enclosure to open the door, generate a command to open the enclosure door. The mitigation module 255 may cause the processor(s) 110 to determine if the enclosure door is open. The mitigation module 255 may also cause the processor(s) 110 to, responsive to a determination that the enclosure door is open, control operation of the vehicle so as to drive the vehicle out of the enclosure. The mitigation module 255 may also cause the processor(s) 110 to, responsive to a determination that the enclosure door is not open, operate the vehicle to shut off the engine.

Operation of the exhaust intrusion mitigation system 250 will now be discussed with reference to FIGS. 4-12.

Figure 4:
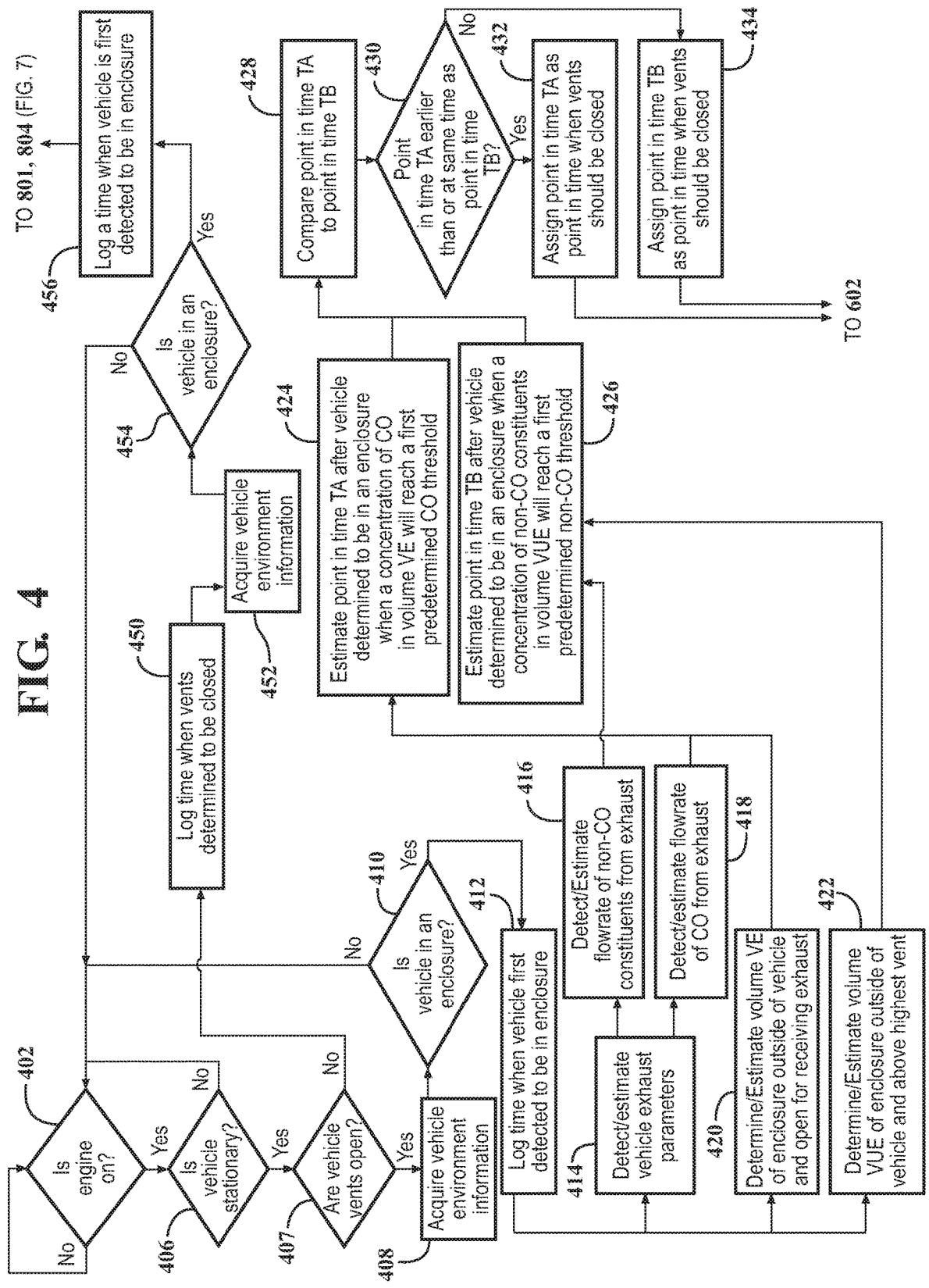
FIG. 4 is a flow diagram illustrating operation of an embodiment of the exhaust intrusion mitigation system to determine when open vehicle vents should be closed to mitigate intrusion of vehicle exhaust.

Referring to FIG. 4, in 402, the enclosure detection module 251 may determine if the vehicle engine is on or off. If the engine is on, the enclosure detection module 251 may determine (in 406) if the vehicle 100 is stationary. If the engine is on and the vehicle 100 is stationary, enclosure detection module 251 may (in 407) determine if any of the vehicle vents 149 are open. A clock or timer (not shown) may begin to run as soon as the engine is turned on. The timer may record elapsed lengths of time with respect to how long the engine has been on. Times from the timer may be used for the desired vent closure times and other mitigation-related times and time periods determined by the exhaust intrusion mitigation system 250 as described herein. If the engine is shut off or it is determined that the vehicle is not in an enclosure, the timer may be stopped and reset to zero.

If none of the vehicle vents 149 are open, enclosure detection module 251 may (in 450) log or flag a point in time when it is determined that the vents are closed. The enclosure detection module 251 may then (in 452) acquire vehicle environment information. When the engine is on and the vehicle 100 is stationary, the environment sensors 122 may constantly scan the vehicle environment to gather data usable for determining if the vehicle 100 is in an enclosure. For example, the environmental sensors 122 may scan the environment surrounding the vehicle to detect the presence or absence of any walls, ceiling, and other boundaries. The dimensions or configuration of an enclosure which triggers operation of the mitigation system can be pre-defined in the system. Whenever the engine switches off, operation of the exhaust intrusion mitigation system may cease.

The enclosure detection module 251 may then (in 454) analyze the sensor data to determine if the vehicle is in an enclosure. The sensor data may also be analyzed to "map" the enclosure (i.e., to determine the physical characteristics of the enclosure, such as the locations and dimensions of walls, the contours of the ceiling and height(s) of portions of the ceiling, the positions and sizes of any objects resting on a floor of the enclosure, and other features that affect the determination of the volume of the enclosure exterior of the vehicle and available for receiving vehicle exhaust therein while the engine is on). This analysis may provide a map of the unoccupied volume of the enclosure for purposes of estimating the times when exhaust components will be deemed to meet the pre-determined thresholds. If the vehicle is determined not to be in an enclosure, control may transfer back to block 402. However, if the vehicle is determined to be in an enclosure, and the physical characteristics of the enclosure have been mapped, the exhaust module may (in 456) log a time when the vehicle is first determined by the enclosure detection module 251 to be in an enclosure. This time may be used to track the total amount of time that the vehicle is in the enclosure, for determining when the vehicle vents 149 are to be closed, and for determining when additional exhaust intrusion mitigation measures should be implemented as described herein. Control may then transfer to blocks 801 and 804 (described in greater detail below), for determination of estimated times when further mitigation may be needed (i.e., after the vents are closed but with the engine continuing to run).

Returning to block 407, if any of the vehicle vents are open, the enclosure detection module 251 may (in 408) acquire vehicle environment information. The enclosure detection module 251 may then (in 410) analyze the sensor data to determine if the vehicle is in an enclosure. The sensor data may also be analyzed to "map" the enclosure as previously described. When the vehicle is determined to be in an enclosure and the physical characteristics of the enclosure have been mapped, the exhaust module may (in 412) log a time when the vehicle is first determined by the enclosure detection module 251 to be in an enclosure. As stated previously, this time may be used to track the total amount of time that the vehicle is in the enclosure, for determining when the vehicle vents are to be closed, and for determining when additional exhaust intrusion mitigation measures should be implemented as described herein.

The exhaust module may then (in 414) detect and/or estimate vehicle exhaust parameters, such as exhaust pressure, temperature, composition, total flowrate, and other parameters needed to make the determinations described herein. At or around the same time that block 414 is executed, the enclosure detection module may (in 420), using sensor data and/or the enclosure volume information previously acquired and/or calculated, determine or estimate the volume VE of the enclosure external to the vehicle and open for receiving exhaust. At or around the same time that blocks 414 and 420 are executed, the enclosure detection module may (in 422), using sensor data and/or the enclosure volume information previously acquired and/or calculated, determine or estimate the volume VUE of the portion of the enclosure residing outside of the vehicle, open for receiving exhaust, and residing above the level of the highest vent (or vents) 101 as indicated by the plane P1 of FIG. 2.

Exhaust parameter information acquired in block 414 may be used (in 416) by the exhaust module 253 to detect or estimate a flowrate of non-CO exhaust constituents from the vehicle. Vehicle sensors may determine the volumetric or mass flowrates of CO and non-CO exhaust constituents as previously described. Exhaust parameter information from block 414 may also be used (in 418) to detect or estimate a flowrate of CO exhaust constituents from the vehicle. CO flowrate information obtained in block 418 and the estimated volume VE from block 420 may be used (in 424) by the exhaust module 253 to estimate a point in time TA, after the vehicle is first determined reside in an enclosure, when a concentration of CO in the volume VE will reach a first predetermined CO threshold. Similarly, non-CO flowrate information obtained in block 416 and the estimated volume VUE from block 422 may be used (in 426) by the exhaust module 253 to estimate a point in time TB, after the vehicle is first determined reside in an enclosure, when a concentration of non-CO constituents in the volume VUE will reach a first predetermined non-CO threshold.

The exhaust module 253 may then (in 428) compare the point in time TA from block 424 and the point in time TB from block 426. If the point in time TA is determined (in 430) to be earlier than or at the same time as the point in time TB, the exhaust module 253 may assign (in 432) the point in time TA to be the point in time when the vehicle vents should be automatically closed. However, if the point in time TA is not earlier than or at the same time as the point in time TB, the exhaust module 253 may assign (in 434) the point in time TB to be the point in time when the vehicle vents 149 should be automatically closed. Thus, the vents will be automatically closed at the earliest point in time when either of the first predetermined non-CO threshold or the first predetermined CO threshold is reached. After assignment of a point in time when the vehicle vents should be closed, control may transfer to block 602 (FIG. 5), where the mitigation module may determine if a user instruction option has been activated by a user of the vehicle.

Figure 5:
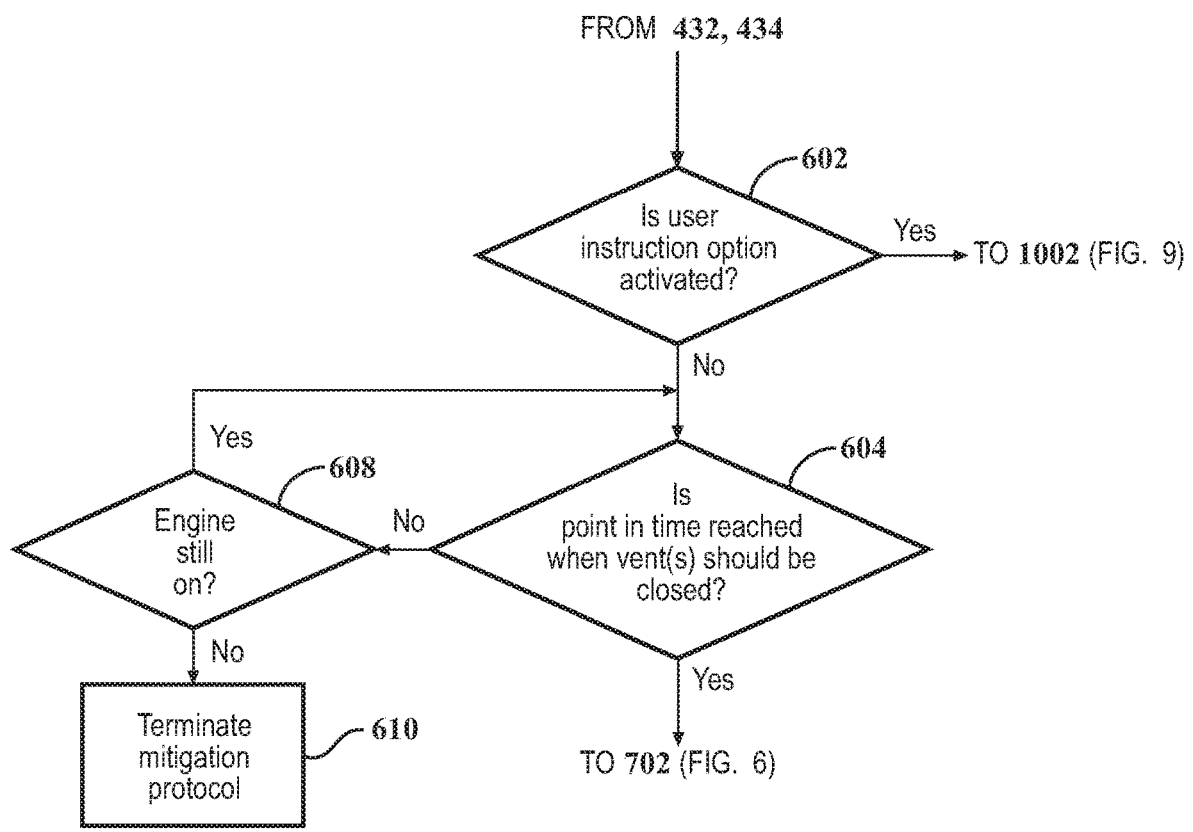
FIG. 5 is a flow diagram illustrating additional aspects of the operation of the exhaust intrusion mitigation system.
Figure 9:
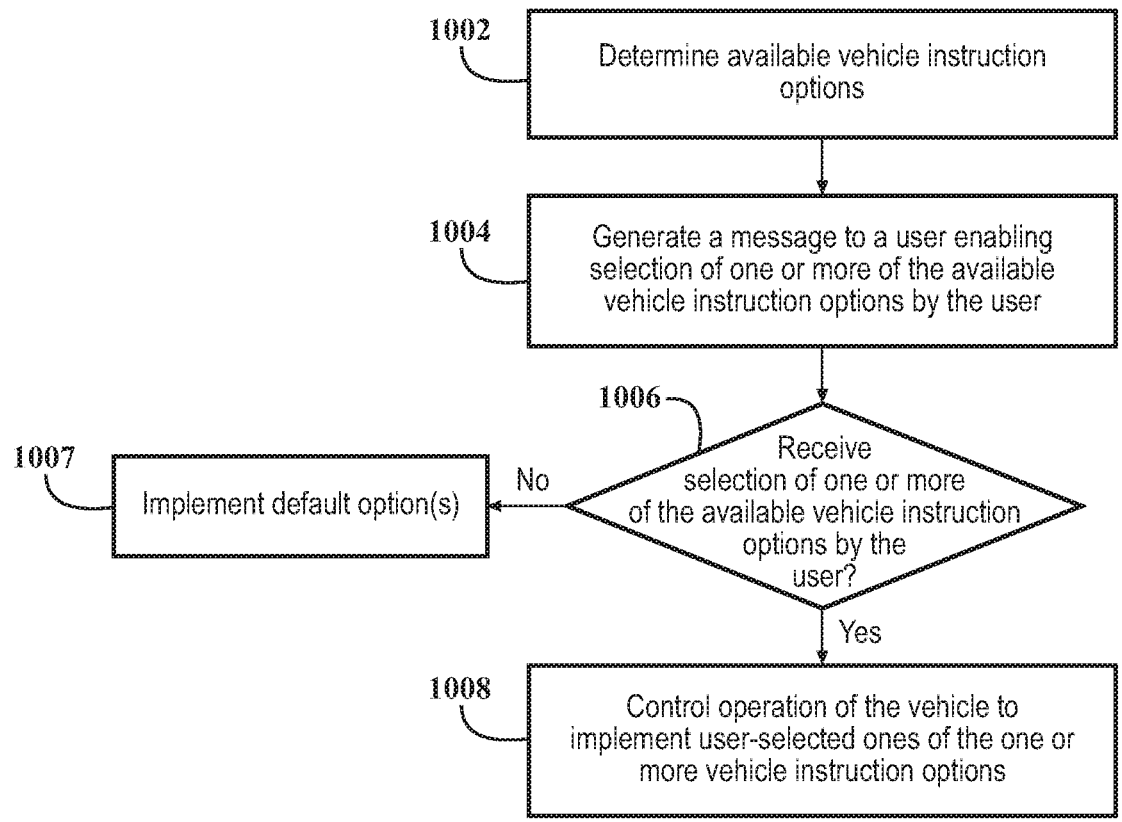
FIG. 9 is a flow diagram illustrating operation of the exhaust intrusion mitigation system to enable a user to select exhaust intrusion mitigation measures to be automatically implemented by the vehicle.

Referring now to FIG. 5, if the user instruction option has been activated, control may transfer to block 1002 (FIG. 9, discussed in greater detail below). However, if the user instruction option has not been activated, control may transfer to block 604 where the mitigation module 255 monitors the elapsed time as indicated by the timer, to determine if the point in time is reached when the vents 149 should be closed. The elapsed time will continue to be monitored until the point in time is reached when the vents 149 should be closed (in 604), or until the engine is determined to be shut off (in 608). If the engine is determined to be off, the mitigation module 255 may (in 610) terminate execution of the exhaust intrusion mitigation protocol. If the point in time is reached when the vents 149 should be closed, control may transfer to block 702 (FIG. 6).

Figure 6:
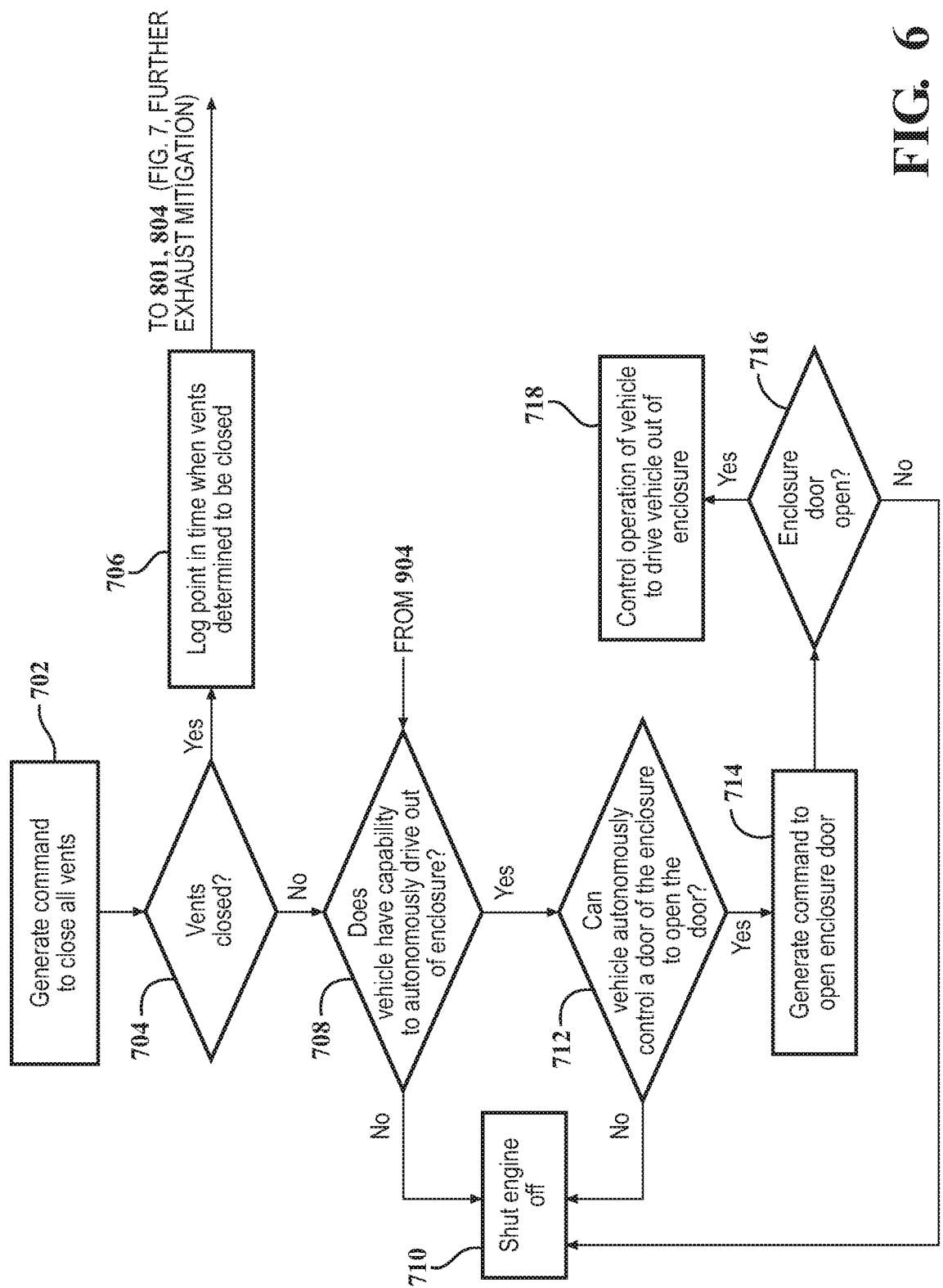
FIG. 6 is a flow diagram illustrating yet additional aspects of the operation of the exhaust intrusion mitigation system.

FIG. 6 illustrates one possible sequence of autonomous vehicle responses directed to mitigating exhaust intrusion without interacting with a user. Referring to FIG. 6, the mitigation module 255 may (in 702) generate a command to close all vehicle vents 149. The mitigation module 255 may then (in 704) determine if all the vents have been closed responsive to the command to close the vents. If the vents 149 have not been closed, the mitigation module 255 may determine (in 708) if the vehicle is capable of autonomously driving itself out of the enclosure. To this end, the mitigation module 255 may communicate with (and operate in conjunction with, if necessary) the autonomous driving module 160 and/or with any other element(s) of the vehicle to ascertain any autonomous driving capabilities of the vehicle, and to determine if these capabilities (if any) are sufficient to enable the vehicle to drive itself out of the particular enclosure in which it resides, assuming that any enclosure door(s) may be opened.

If the autonomous driving capabilities of the vehicle are sufficient to enable the vehicle to drive itself out of the particular enclosure in which it resides, the mitigation module 255 may (in 712) determine if the vehicle can autonomously control a door 290*d* of the enclosure to open the door. To this end, the mitigation module 255 may communicate with any other element(s) of the vehicle 100 to determine whether the enclosure door may be controlled. If the enclosure door cannot be controlled autonomously, it may be determined infeasible to mitigate possible exhaust intrusion by exiting the enclosure. In this case, the mitigation module 255 may (in 710) shut off the engine to mitigate exhaust intrusion. However, if the enclosure door can be controlled autonomously, the mitigation module 255 may (in 714) generate (or signal another element of the vehicle to generate) a command to open the enclosure door. The mitigation module 255 may then (in 716) determine if the enclosure door is open responsive to the command. If the enclosure door is open responsive to the command, the autonomous driving module may (in 718) generate one or more commands to the autonomous driving module be instructed to control operation of the vehicle to drive the vehicle out of the enclosure. However, if the enclosure door is not open, the mitigation module 255 may (in 710) shut off the engine to mitigate exhaust intrusion.

Figure 7:
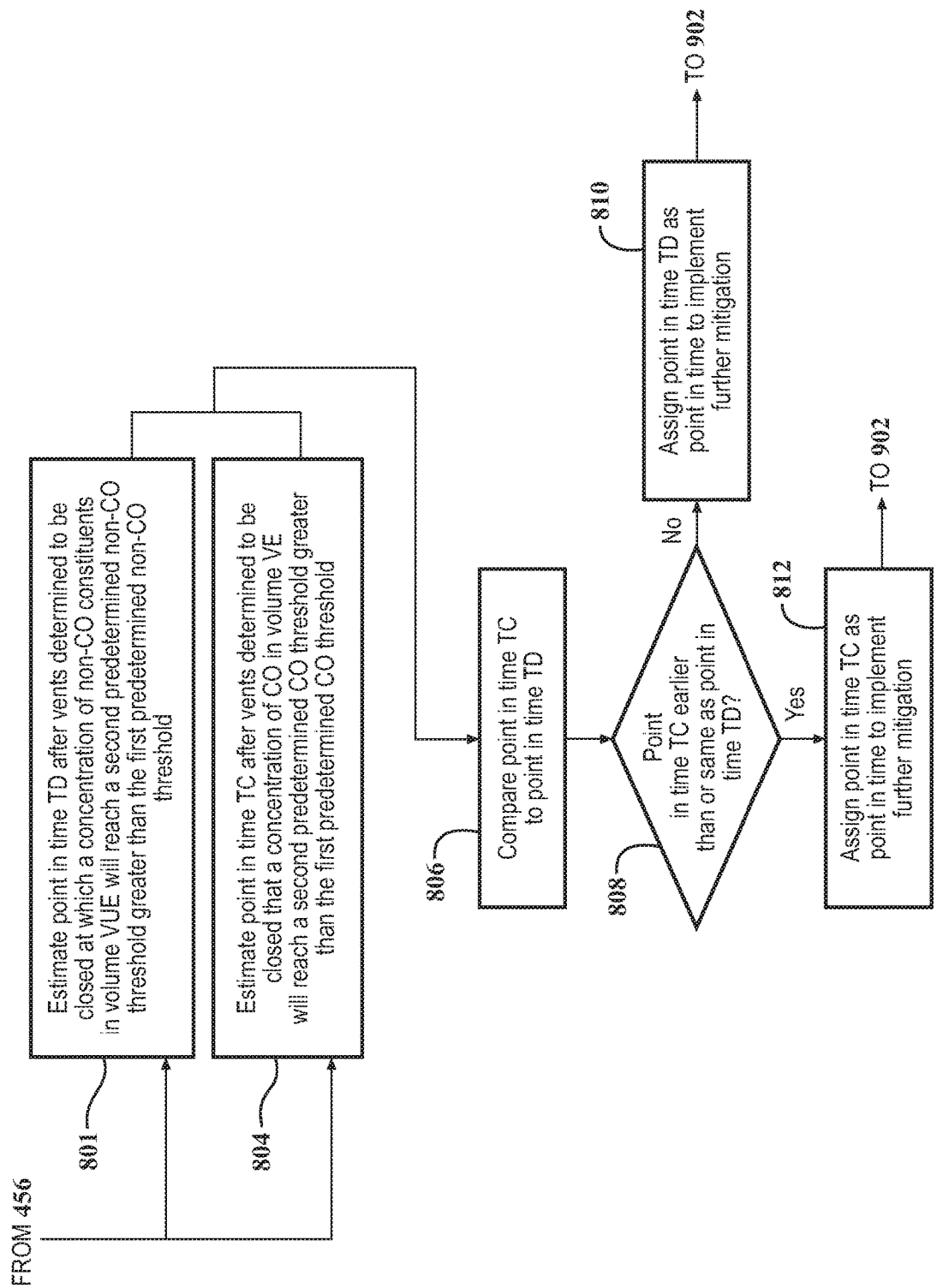
FIG. 7 is a flow diagram illustrating operation of an embodiment of the exhaust intrusion mitigation system to determine when further exhaust intrusion mitigation measures should be implemented after the vehicle vents have been closed.

Returning to block 704 of FIG. 6, if all the vents 149 have been closed responsive to the command to close the vents, the mitigation module 255 may (in 706) store or log the point in time when the vents are determined to be closed. Control may then proceed to blocks 801 and 804 of FIG. 7. FIG. 7 illustrates possible additional autonomous vehicle responses directed to mitigating exhaust intrusion without interacting with a user. The mitigation steps shown in FIG. 7 may be further mitigation steps which may be taken in situations where the vents 149 have been closed, but the vehicle remains in the enclosure with the engine running. At some point, the concentrations of exhaust products may reach levels where the exhaust seeps through the closed vents. The steps in FIG. 7 may be directed at estimating threshold exhaust constituent levels where such seepage ay occur, and triggering additional mitigation measures prior to reaching a threshold level, or by the time a threshold level is reached. The seepage thresholds for particular exhaust constituents may be determined and set for by analysis and/or experimentation for particular vent and vehicle designs by vehicle and/or vent manufacturers. In one or more arrangements, the threshold concentrations used in determining when to further mitigate may be below the actual projected concentrations at which seepage may occur.

The mitigation module may (in 804) estimate a point in time TC after the vehicle vents 149 are closed that a concentration of CO in volume VE will reach a second predetermined CO threshold higher than the first predetermined CO threshold. The mitigation module may also (in 801), simultaneously with executing block 804, estimate a point in time TD after the vents 149 are closed at which an concentration of non-CO constituents in volume VUE will reach a second predetermined non-CO threshold higher than the first predetermined non-CO threshold. The mitigation module may then (in 806) compare the point in time TC to the point in time TD to determine (in 808) if the point in time TC is earlier than or the same as the point in time TD. If the point in time TC is earlier than or the same as the point in time TD, the mitigation module may (in 810) assign the point in time TC as the point in time to implement further mitigation. However, if the point in time TC is not earlier than or the same as the point in time TD, the mitigation module may (in 812) assign the point in time TD as the point in time to implement further mitigation. In either case, after the point in time to implement further mitigation has been assigned, control may transfer to block 902 (FIG. 8).

Figure 8:
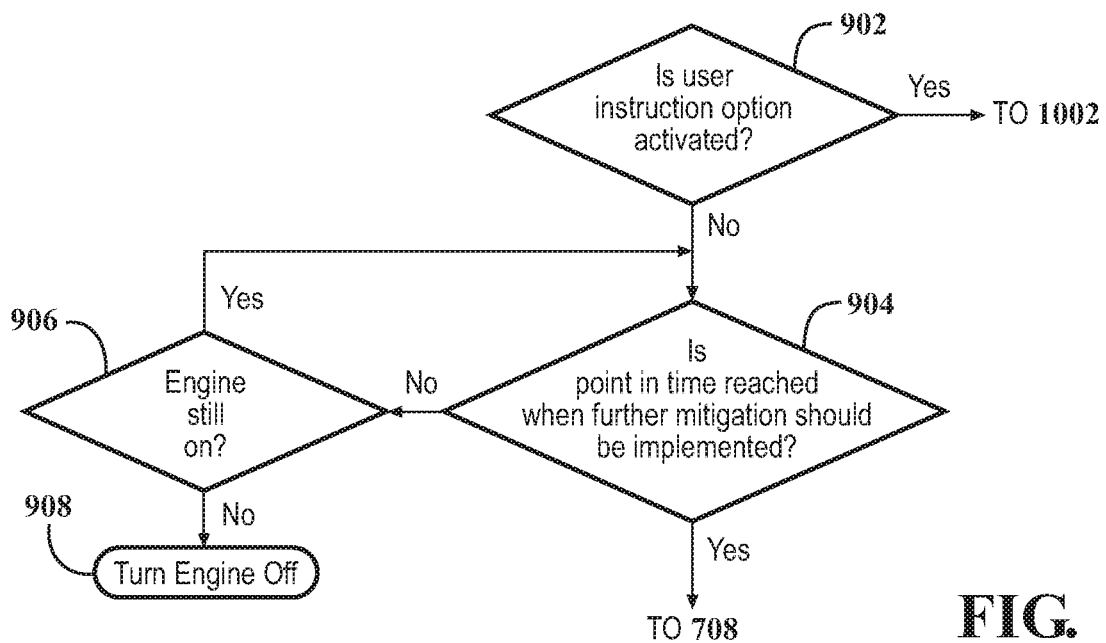
FIG. 8 is a flow diagram illustrating yet additional aspects of the operation of the exhaust intrusion mitigation system.

Referring to FIG. 8, for purposes of further mitigation after the vehicle vents 149 have been closed, the mitigation module 255 may determine if the user instruction option has been activated. If the user instruction option has been activated, the mitigation module 255 may proceed to block 1002 as described below with regard to FIGS. 9-12 to enable a user to interactively select available mitigation steps. However, if the user instruction option is not activated, the mitigation module 255 may (in 904) determine if the point in time has been reached when further mitigation measures should be implemented. The mitigation module 255 may continue monitoring for this point in time while the engine remains on (block 906). If the engine is shut off, execution of the exhaust intrusion mitigation protocol may terminate (block 908). However, if the point in time has been reached when further mitigation measures should be implemented, control may transfer to block 708 (FIG. 6), from which control will proceed as previously described.

Referring to FIG. 9, if the user instruction option was previously activated by a user, the mitigation module 255 may interact with the user to provide alert messages and other information to the user to facilitate user decision making, and to present available mitigation options to the user. The mitigation module 255 may receive user-selected mitigation options to be implemented by the module 255. Thus, mitigation options may be selected by the user rather than by default. Available default mitigation options may be implemented if the user does not respond to queries. Default options to be implemented may be in case the user does not respond may be pre-selected by the user and/or programmed into the system. Such options may include closing all vehicle vents, shutting off the engine, and/or other options.

Referring to FIG. 9, for example, if the user instruction option is active, the mitigation module 255 may (in 1002) determine available user vehicle instruction options for presentation to the user. The available user instruction options may depend on the vehicle capabilities (e.g., autonomous driving capability) and other pertinent factors. After determining available user vehicle instruction options, the mitigation module 255 may (in 1004) generate a message to a user enabling selection of one or more of the available vehicle instruction options by the user. The message may be forwarded to the user's computer, cellular device (as a text, touch or voice actuatable menu), or via any other suitable communications medium.

The mitigation module 255 may then (in 1006) determine if a selection of one or more of the available vehicle instruction options by the user has been received. If a selection of one or more of the available vehicle instruction options by the user has not been received, the mitigation module 255 may (in block 1007) implement default mitigation option(s). However, if a selection of one or more of the available vehicle instruction options by the user has been received, the mitigation module 255 may (in 1008) control operation of the vehicle 100 to implement user-selected ones of the one or more vehicle instruction options. If the user does not select any of the options presented, the mitigation module 255 may autonomously execute default mitigation options.

Figure 3:
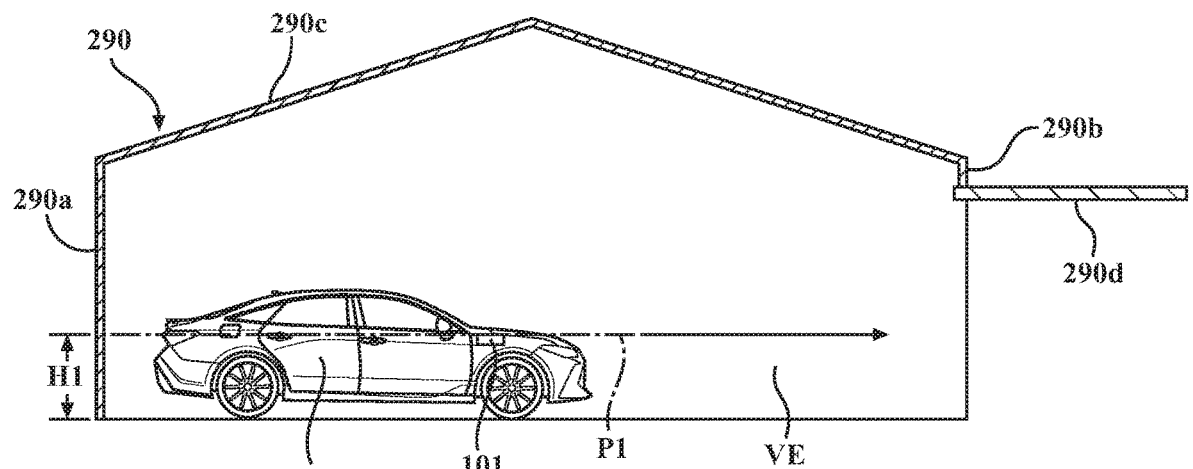
FIG. 3 is the view of FIG. 2 showing an example of a vehicle being autonomously driven from an opened door of an enclosure as an exhaust intrusion mitigation measure.
Figure 10:
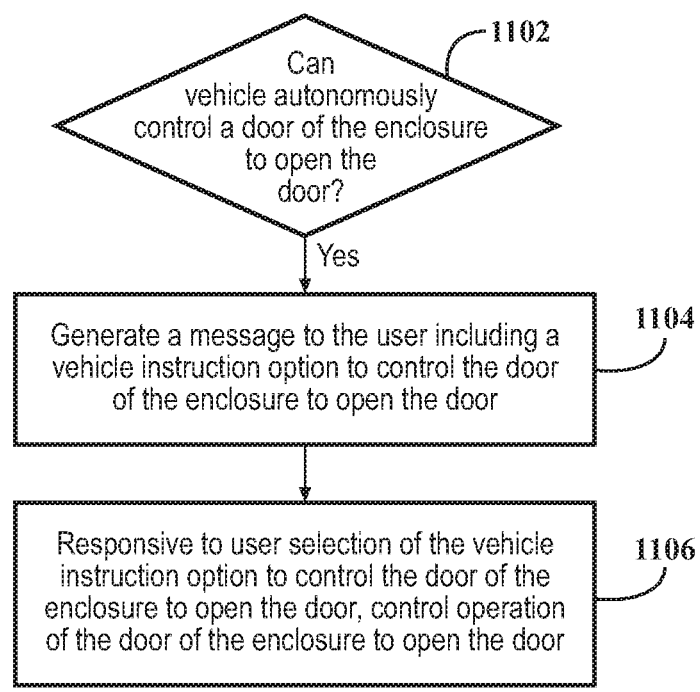
FIG. 10 is a flow diagram illustrating an example of an exhaust intrusion mitigation measure selectable by the user for implementation by the vehicle.
Figure 11:
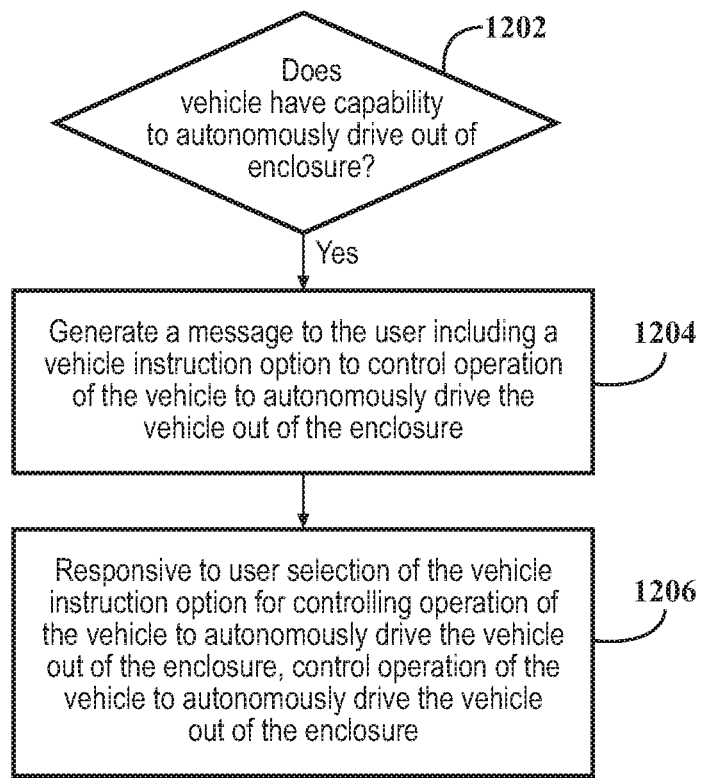
FIG. 11 is a flow diagram illustrating another example of an exhaust intrusion mitigation measure selectable by the user for implementation by the vehicle.
Figure 12:
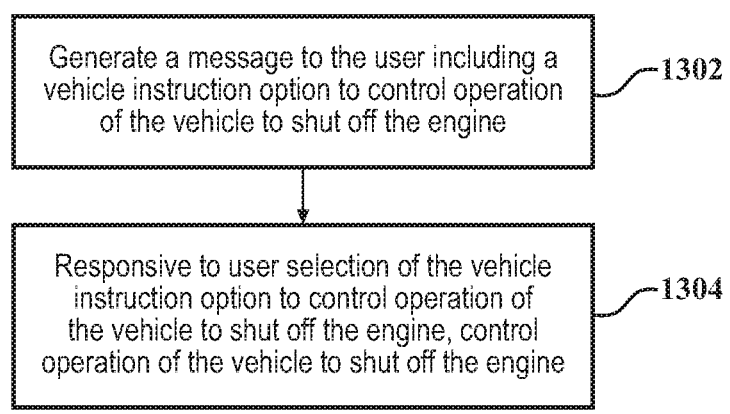
FIG. 12 is a flow diagram illustrating yet another example of an exhaust intrusion mitigation measure selectable by the user for implementation by the vehicle.

FIGS. 10-12 show examples of determination of available user vehicle instruction options which may be presented to a user based on availability of the option. In FIG. 10, for example, the mitigation module 255 may (in 1102) determine if the vehicle can autonomously control a door 290*d* of the enclosure 290 to open the door. If the vehicle 100 can autonomously control the door 290*d* of the enclosure 290 to open the door, the mitigation module 255 may (in 1104) generate a message to the user including a vehicle instruction option to control the door of the enclosure to open the door 290*d*. If the user selects the option to control the door 290*d* of the enclosure to open the door, the mitigation module 255 may then (in 1106), responsive to user selection of the vehicle instruction, control operation of the door of the enclosure to open the door 290*d* (FIG. 3) at a suitable point in time determined by levels of exhaust constituents reaching the predetermined thresholds and other factors, as previously described.

Referring to FIG. 11, in another example, the mitigation module 255 may cause the processors to (in 1202) determine if the vehicle is capable of autonomously driving itself out of the enclosure. If the vehicle is determined to be capable of driving itself out of the enclosure, the mitigation module may (in 1204) generate a message to the user including a vehicle instruction option to control operation of the vehicle to autonomously drive the vehicle out of the enclosure. Then, responsive to a user selection of the vehicle instruction option for controlling operation of the vehicle to autonomously drive the vehicle out of the enclosure, the mitigation module 255 may (in 1206) generate one or more signals to the autonomous driving module 160 to control operation of the vehicle to autonomously drive the vehicle out of the enclosure (FIG. 3) at a suitable point in time determined by levels of exhaust constituents reaching the predetermined thresholds and other factors, as previously described. Due for the need for the enclosure door 290*d* to be open for the vehicle 100 to be driven out of the enclosure 290, the option to drive the vehicle may only be presented if the enclosure door is open, if the vehicle 100 is capable of opening the enclosure door as described in FIG. 10, or if the door may be opened in another way (for example, by direct command from the user).

Referring to FIG. 12, in another example, the mitigation module 255 may (in 1302) generate a message to the user including a vehicle instruction option to control operation of the vehicle to shut of the engine. Responsive to user selection of the vehicle instruction shut off the engine, the mitigation module 255 may (in 1304) control operation of the vehicle to shut of the engine at a suitable point in time determined by levels of exhaust constituents reaching the predetermined thresholds and other factors, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An exhaust intrusion mitigation system for a vehicle, the system comprising:
   one or more processors;
   a memory communicably coupled to the one or more processors and storing:
   an enclosure detection module including instructions that, when executed by the one or more processors, cause the one or more processors to:
   determine if a vehicle engine is turned on;
   responsive to a determination that the engine is turned on,
   determine if the vehicle is stationary;
   responsive to a determination that the vehicle is stationary and the determination that the engine is turned on, determine if the vehicle currently resides within an enclosure;

an exhaust module including instructions that when executed by the one or more processors cause the one or more processors to, responsive to the determinations that the vehicle is stationary, the engine is turned on, and the vehicle currently resides within the enclosure, determine a point in time at which at least one vent of the vehicle is to be closed if the vehicle remains in the enclosure and the engine remains on; and a mitigation module including instructions that when executed by the one or more processors cause the one or more processors to control an operation of the vehicle to close the at least one vent at the point in time when the at least one vent is to be closed.

2. The exhaust intrusion mitigation system of claim 1 wherein the enclosure detection module further includes instructions that, when executed by the one or more processors, cause the one or more processors to determine or estimate a total volume within the enclosure which is occupied by vehicle exhaust.

3. The exhaust intrusion mitigation system of claim 1 wherein the enclosure detection module further includes instructions that, when executed by the one or more processors, cause the one or more processors to estimate a volume of within the enclosure residing outside of the vehicle and above a level of an opening of a highest vent of the vehicle which is occupied by vehicle exhaust.

4. The exhaust intrusion mitigation system of claim 1 wherein the exhaust module further includes instructions that, when executed by the one or more processors, cause the one or more processors to:
estimate a flowrate of carbon monoxide in exhaust being discharged from the vehicle; and
based on an estimated flowrate of the carbon monoxide being discharged from the vehicle, estimate a point in time when a level of the carbon monoxide from the exhaust in a total volume within the enclosure outside of the vehicle which is occupied by the exhaust will reach a first predetermined carbon monoxide threshold.

5. The exhaust intrusion mitigation system of claim 4 wherein the exhaust module further includes instructions that, when executed by the one or more processors, cause the one or more processors to:
estimate a flowrate of exhaust constituents other than carbon monoxide being discharged from the vehicle; and
based on an estimated flowrate of the exhaust constituents other than the carbon monoxide being discharged from the vehicle, estimate a point in time when a level of constituents other than the carbon monoxide from the exhaust in a volume within the enclosure outside of the vehicle and above a level of an opening of a highest vent of the vehicle which is occupied by the exhaust will reach a first predetermined non-carbon monoxide constituent threshold.

6. The exhaust intrusion mitigation system of claim 5 wherein the exhaust module further includes instructions that, when executed by the one or more processors, cause the one or more processors to:
determine if the point in time when the carbon monoxide will reach the first predetermined carbon monoxide threshold will arrive earlier than or at the same time as the point in time when the constituents other than carbon monoxide will reach the first predetermined non-carbon monoxide constituent threshold;
if the point in time when the level of carbon monoxide will reach the first predetermined carbon monoxide threshold will arrive earlier than or at the same time as the point in time when the level of constituents other than carbon monoxide will reach the first predetermined non-carbon monoxide constituent threshold, assign, as the point in time when the at least one vent is to be closed, the point in time when the level of carbon monoxide will reach the first predetermined carbon monoxide threshold; and
if the point in time when the level of constituents other than carbon monoxide will reach the first predetermined non-carbon monoxide constituent threshold will arrive earlier than the point in time when the level of carbon monoxide will reach the first predetermined carbon monoxide threshold, assign, as the point in time when the at least one vent is to be closed, the point in time when the level of constituents other than carbon monoxide will reach the first predetermined non-carbon monoxide constituent threshold.

7. The exhaust intrusion mitigation system of claim 1 wherein the mitigation module includes instructions that when executed by the one or more processors cause the one or more processors to:
prior to the point in time when the at least one vent is to be closed, determine if a system user instruction option is activated;
responsive to a determination that the system user instruction option is activated, determine available vehicle instruction options;
generate a message to a user, the message being configured to enable selection of one or more of the available vehicle instruction options by the user; and
responsive to the selection of the one or more of the available vehicle instruction options by the user, control an operation of the vehicle to implement the user-selected one or more available vehicle instruction options.

8. The exhaust intrusion mitigation system of claim 7 wherein the mitigation module further includes instructions that when executed by the one or more processors cause the one or more processors to generate a message to the user including a vehicle instruction option to transmit to the user a live video feed comprising vehicle camera images of vehicle surroundings including at least a portion of the enclosure.

9. The exhaust intrusion mitigation system of claim 7 wherein the mitigation module further includes instructions that when executed by the one or more processors cause the one or more processors to:
determine if the vehicle is capable of autonomously controlling/operating a door of the enclosure to open the door;
responsive to a determination that the vehicle is capable of autonomously controlling the door of the enclosure to open the door generate a message to the user including a vehicle instruction option to control the door of the enclosure to open the door; and
responsive to user selection of the vehicle instruction option to control the door of the enclosure to open the door, control an operation of the door of the enclosure to open the door.

10. The exhaust intrusion mitigation system of claim 7 wherein the mitigation module further includes instructions that when executed by the one or more processors cause the one or more processors to:
determine if the vehicle is capable of autonomously driving itself out of the enclosure;

responsive to a determination that the vehicle is capable of autonomously driving itself out of the enclosure, generate a message to the user including a vehicle instruction option to control an operation of the vehicle to autonomously drive the vehicle out of the enclosure; and responsive to user selection of the vehicle instruction option for controlling the operation of the vehicle to autonomously drive the vehicle out of the enclosure, generate one or more signals to an autonomous driving module of the vehicle to control the operation of the vehicle to autonomously drive the vehicle out of the enclosure.

11. The exhaust intrusion mitigation system of claim 7 wherein the mitigation module further includes instructions that when executed by the one or more processors cause the one or more processors to:

generate a message to the user including a vehicle instruction option to control an operation of the vehicle to shut off the engine; and responsive to user selection of the vehicle instruction option to control the operation of the vehicle to shut off the engine, control the operation of the vehicle to shut off the engine.

12. The exhaust intrusion mitigation system of claim 1 wherein the mitigation module further includes instructions that when executed by the processors cause the one or more processors to:

prior to the point in time when the at least one vent is to be closed, determine if a system user instruction option is activated;

responsive to a determination that the system user instruction option is not activated, determine if the point in time when the at least one vent is to be closed has been reached;

responsive to a determination that the point in time when the at least one vent is to be closed has been reached, generate a command to close all vehicle vents;

determine if all vehicle vents are closed;

responsive to a determination that all vehicle vents are not closed, determine if the vehicle is capable of autonomously driving itself out of the enclosure; and responsive to a determination that the vehicle is not capable of autonomously driving itself out of the enclosure, control an operation of the vehicle to shut off the engine.

13. The exhaust intrusion mitigation system of claim 12 wherein the mitigation module further includes instructions that when executed by the processors cause the one or more processors to:

responsive to a determination that the vehicle is capable of autonomously driving itself out of the enclosure, determine if the vehicle is capable of autonomously controlling a door of the enclosure to open the door; and responsive to a determination that the vehicle is not capable of autonomously controlling the door of the enclosure to open the door, control the operation of the vehicle to shut off the engine.

14. The exhaust intrusion mitigation system of claim 13 wherein the mitigation module further includes instructions that when executed by the processors cause the one or more processors to:

responsive to a determination that the vehicle is capable of autonomously controlling the door of the enclosure to open the door, generate a command to open the door;

determine if the door of the enclosure is open;

responsive to a determination that the door of the enclosure is open, control an operation of the vehicle so that the vehicle is driven out of the enclosure; and responsive to a determination that the door of the enclosure is not open, control the operation of the vehicle to shut off the engine.

15. The exhaust intrusion mitigation system of claim 13 wherein the exhaust module further includes instructions that when executed by the processors cause the one or more processors to:

estimate a point in time when a level of carbon monoxide from vehicle exhaust in a total volume within the enclosure outside of the vehicle will reach a second predetermined carbon monoxide threshold;

estimate a point in time when a level of constituents other than carbon monoxide from the vehicle exhaust in a volume within the enclosure outside of the vehicle and above a level of an opening of a highest vent of the vehicle will reach a second predetermined non-carbon monoxide constituent threshold;

determine if the point in time when the level of the carbon monoxide will reach the second predetermined carbon monoxide threshold will arrive earlier than or at the same time as the point in time when the level of the constituents other than the carbon monoxide will reach the second predetermined non-carbon monoxide constituent threshold;

if the point in time when the level of the carbon monoxide will reach the second predetermined carbon monoxide threshold will arrive earlier than or at the same time as the point in time when the level of the constituents other than the carbon monoxide will reach the second predetermined non-carbon monoxide constituent threshold, assign, as a point in time to implement further mitigation, the point in time when the level of the carbon monoxide will reach the second predetermined carbon monoxide threshold; and if the point in time when the level of the constituents other than the carbon monoxide will reach the second predetermined non-carbon monoxide constituent threshold will arrive earlier than the point in time when the level of the carbon monoxide will reach the second predetermined carbon monoxide threshold, assign, as the point in time to implement further mitigation, the point in time when the level of the constituents other than the carbon monoxide will reach the second predetermined non-carbon monoxide constituent threshold.

16. A vehicle including an exhaust intrusion mitigation system in accordance with claim 1.

17. A method for mitigating intrusion of vehicle exhaust into an occupant compartment of a vehicle, the method comprising steps of:

by an enclosure detection module of the vehicle, determining that a vehicle engine is turned on, that the vehicle is stationary, and that the vehicle currently resides within an enclosure;

by an exhaust module of the vehicle, determining a point in time at which vehicle vents are to be closed if the vehicle remains in the enclosure and the engine remains on; and by a mitigation module of the vehicle, controlling an operation of the vehicle to close the vehicle vents at the point in time when the vehicle vents are to be closed.

18. The method of claim 17 further comprising steps of, by the mitigation module:
- responsive to a determination that the point in time when the vehicle vents are to be closed has been reached, generating a command to close all vehicle vents;
- determining that all vehicle vents are not closed;
- responsive to the determination that all vehicle vents are not closed, determining if the vehicle is capable of autonomously driving itself out of the enclosure; and
- responsive to a determination that the vehicle is not capable of autonomously driving itself out of the enclosure, controlling an operation of the vehicle to shut off the engine.

19. The method of claim 18 further comprising steps of, by the mitigation module:
- responsive to a determination that the vehicle is capable of autonomously driving itself out of the enclosure, determining if the vehicle is capable of autonomously controlling a door of the enclosure to open the door; and
- responsive to a determination that the vehicle is not capable of autonomously controlling a door of the enclosure to open the door, controlling the operation of the vehicle to shut off the engine;
- responsive to a determination that the vehicle is capable of autonomously controlling the door of the enclosure to open the door, generating a command to open the door of the enclosure.

20. The method of claim 19 further comprising steps of, by the mitigation module:
- determining if the door of the enclosure is open;
- responsive to a determination that the door of the enclosure is open, controlling an operation of the vehicle so that the vehicle is driven out of the enclosure; and
- responsive to a determination that the door of the enclosure is not open, controlling the operation of the vehicle to shut off the engine.

\* \* \* \* \*